BLACK LEVEL CONTROL IN TELEVISION TRAMSMISSION
Filed Dec. 15, 1949
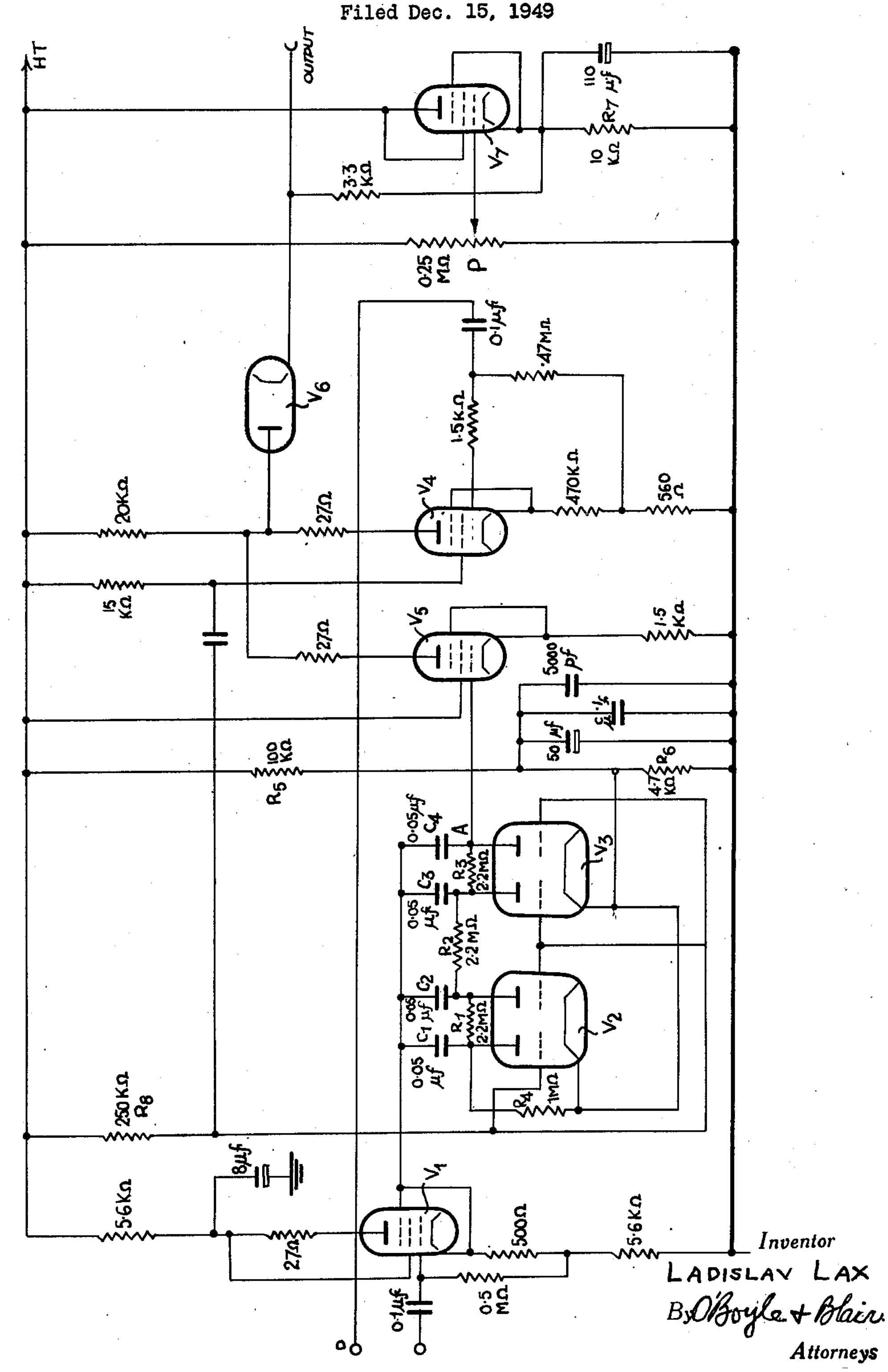
Inventor
LADISLAV LAX
By O'Boyle + Blair
Attorneys Patented Dec. 2, 1952 2,620,392

UNITED STATES PATENT OFFICE 2,620,392

BLACK LEVEL CONTROL IN TELEVISION TRANSMISSION

Ladislav Lax, Cambridge, England, assignor to Pye Limited, Cambridge, England, a British company Application December 15, 1949, Serial No. 133,096
In Great Britain December 17, 1948

16 Claims. (Cl. 178—7.1)

The present invention relates to black level control in television transmission, such as occur in television waveforms, and has for its object to provide a circuit arrangement which is responsive to short peak voltages and of which the shape of the decay curve is flatter in its initial period whereby the voltage condition established in the circuit by a peak will be substantially maintained during the interval between successive peaks.

A further object of the invention is to provide a circuit arrangement for setting the black level in a television transmitting apparatus, whereby the black level setting can be maintained even on the shortest black peak in the waveform being transmitted.

It is known to measure peak voltages by means of a D. C. restoring circuit comprising a diode or equivalent rectifier of which the cathode is maintained at a predetermined potential and is connected to the anode through a leakage resistor, the voltage waveform of which the peaks are to be measured being fed to an anode through a condenser. At the anode, the positive peaks of the applied waveform will be restored to the cathode potential by reason of the fact that through the action of the diode a negative D. C. component is added to the waveform which is equal to the positive peak voltage reckoned from the average. This negative component leaks away through the leakage resistor. In order to flatten the shape of the decay curve in its initial period, the present invention consists in providing one or more additional diodes or like rectifiers having their cathodes connected to the cathode of the first diode and their anodes interconnected by resistors to the anode of the first diode, the anodes of the further diode or diodes also being fed by the applied waveform through condensers.

Thus if a total of three diodes are provided, the first diode is connected as a usual D. C. restoring diode with a leakage resistor shunting its anode and cathode, and the cathodes of the three diodes are connected together. The anode of the first diode is connected to the anode of the second diode through the resistor, and the anode of the second diode is connected to the anode of the third diode through a further resistor, each of the anodes being connected through separate condensers to the applied waveform. With the arrangement described the second diode does not discharge through the leakage resistor shunting the first diode until the anode potential of the first diode has changed; similarly the discharge of the anode of the third diode is further delayed and its potential changes more slowly than that of either the other two diodes. The voltage decay curve of the third diode is therefore flattened in its initial period and can be more easily used for measuring the voltage of short duration voltage peaks or pulses or for using this voltage for control purposes.

The invention can be used for setting the black level of a television transmitting system. It is important that the black level setting should remain constant throughout the entire transmission in order that fluctuation of picture brightness should be reduced as much as possible, and the present invention enables this setting to be accurately maintained even if only a very brief black dot occurs during each picture period. A circuit arrangement for controlling the black level setting in a television transmitting system operating according to the standard British television waveform is illustrated in the accompanying drawing.

Referring to the drawing, the negative picture wave form is applied to the valve V1 which is connected as a cathode follower in order to obtain the low impedance necessary for charging the condensers of the measuring circuit on short duration pulses. The circuit for measuring the black peaks of the picture comprise the two double triodes V2, V3, the anodes of which are connected to the cathode of the valve V1 through the condensers C1, C2, C3, C4 respectively. The two anodes of valve V2 are connected together by the resistor R1, the second anode of V2 is connected to the first anode of V3 by the resistor R2, and the two anodes of V3 are connected together by the resistor R3. The cathodes of both valves V2, V3 are connected together and to the first anode of V2 through the leakage resistor R4. The cathodes of the two valves are maintained at a pre-determined potential by a connection to an intermediate point of the potentiometer R5, R6. The control grids of V2 and V3 are tied together and connected via R8 to the H. T. supply. The effect of this is that the grids are at cathode potential. The two valves V2, V3 are thus connected as D. C. restorers and maintain the potentials of their anodes at the cathode potential since any increase in potential of the anodes immediately produces current in the valves. The positive peaks, corresponding to the black peaks of the picture waveform, applied to the anodes of the valve V2, V3 will thus be restored to the cathode potential by reason of the fact that through the action of the valves a negative D. C. component is added to the waveform which is equal to the positive peak voltages of the inverted waveform corresponding to black in the picture. The potentials on the various anodes will leak away through the resistor R4, but by reason of the resistors R1, R2, R3, the potential on the second anode of V2 will not discharge through R4 until the potential on the first anode of V2 has partly discharged. Similarly the discharge of the potentials on the first and second anodes of the valve V3 will be further delayed and the shape of the decay curve at the point A is flattened in its initial period.

The condensers, C1, C2, C3 and C4, are made small so that they can be charged up by peaks corresponding to very smallest areas of black in the picture waveform. Thus with the arrangement described, the potential at A restores to the blackest part of the picture, even to a very brief black dot, and this potential is held during at least one complete frame by reason of the delayed voltage decay. Thus at the point A the complete picture waveform appears with the black peaks always at the same potential.

Between successive lines of the picture, spurious signals occur which are produced by the line time base. These spurious signals have peaks which may exceed the black peaks and would affect the black level setting unless blanked out. To achieve this blanking the valves V2 and V3 are constructed as triodes to the grids of which negative blanking pulses are applied during the interline blanking periods to cut off the triodes during these periods and prevent the spurious signals from displacing the picture waveform with respect to D. C. restoration. These negative cut-off pulses are derived from the screening grid of valve V4, to the control grid of which positive blanking pulses are applied from the input terminal B. These blanking pulses are derived from the waveform generator of the transmitter. The cut-off potentials applied to the grids of the valves V2 and V3 are sufficiently large to prevent any of the spurious signals from affecting the restoration of the anodes to the black level.

The picture waveform at point A with the black level maintained at a constant potential, is amplified by the valve V5, the anode of which is connected to the anode of diode V6 of which the cathode potential is adjusted to a predetermined value which is approximately equal to the black level potential of the positive picture waveform at the anode of V6. Thus the diode V6 cuts off the negative blanking pulses appearing in the positive picture waveform appearing at its anode so that the blanking periods correspond with the black level.

The cathode potential of the diode V6 is controlled by varying the D. C. bias applied to the grid of valve V7 by the potentiometer P. By varying this bias the current flowing through V7 is varied and consequently the voltage drop across the cathode resistor R7 can be adjusted. The cathode of V7 is connected to the cathode of the diode of V6 so that by varying the setting of the potentiometer P, the cathode potential of the diode V6 can be adjusted to the desired black level potential. The diode V6 thus only conducts on positive potentials exceeding the black level so that the large negative blanking pulses and the spurious peaks are cut off and there is obtained at the output terminal C a picture waveform with the black level at a fixed potential. Potentiometer P is preferably adjusted slightly below the black level potential so that the output picture waveform is raised on a smal pedestal with the interline blanking periods a small amount below the black level potential. The potentiometer P thus serves as a "lift" control.

I claim:

1. Apparatus for deriving a D. C. control voltage corresponding to the peak voltage of but of longer duration than short duration peaks or pulses in a waveform, comprising at least three electronic rectifiers, each having a cathode and an anode, means interconnecting said cathodes together and for maintaining said cathodes at a common predetermined D. C. potential, a first resistor connected directly between said cathodes and the anode of the first rectifier, a plurality of further resistors directly connected respectively between successive pairs of anodes of the rectifiers, an input for the waveform from which the D. C. control voltage is to be derived, a plurality of condensers corresponding in number to the number of rectifiers, said condensers each having one of their electrodes connected to said input and their other electrodes connected respectively to the anodes of said rectifiers, and an output lead from the point of connection of the anode of the last rectifier and the electrode of the condenser connected thereto.

2. Apparatus as claimed in claim 1, wherein all the cathodes are connected to a common point on a potentiometer connected across a source of D. C. potential.

3. Apparatus as claimed in claim 1, wherein each of the rectifiers also has a control electrode, means connecting all said control electrodes together and normally maintaining them at the potential of said cathodes, and means for periodically biassing said control electrodes negatively with respect to said cathodes.

4. Apparatus for deriving a D. C. control voltage corresponding to the peak voltage of but of longer duration than short duration peaks or pulses in a waveform, comprising two electronic rectifiers, each having a cathode and an anode, means interconnecting said cathodes together and for maintaining said cathodes at a common predetermined D. C. potential, a first resistor connected directly between said cathodes and the anode of the first rectifier, a second resistor connected directly between the anodes of the first and second rectifiers, an input for the waveform from which the D. C. control voltage is to be derived, two condensers each having one of their electrodes connected directly together and to said input and their other electrodes connected respectively to the anodes of said rectifiers, and an output lead from the point of connection of the anode of the second rectifier and the electrode of the condenser connected thereto.

5. Apparatus as claimed in claim 4, wherein both the cathodes are connected to a common point on a potentiometer connected across a source of D. C. potential.

6. Apparatus as claimed in claim 4, wherein each of the rectifiers also has a control electrode, means connecting all said control electrodes together and normally maintaining them at the potential of said cathodes, and means for periodically biassing said control electrodes negatively with respect to said cathodes.

7. A circuit arrangement for setting the black level in a television transmitting apparatus, comprising a plurality of electronic rectifiers each having a cathode and an anode, means interconnecting all the cathodes of said rectifiers and connecting them to a common source of steady D. C. potential, a first resistor connected directly between said cathodes and the anode of the first rectifier, at least one further resistor, the number of said further resistors corresponding to the number of rectifiers less one, each further resistor being directly connected between successive pairs of anodes of the rectifiers, a plurality of condensers connected respectively between an input lead and the anodes of said rectifiers, means for feeding a video waveform to said input lead with such sign that the peaks of the waveform corresponding to black are positive with respect to the peaks corresponding to white, and an output lead from the point of connection of the anode of the last rectifier and the electrode of the condenser connected thereto.

8. A circuit arrangement for setting the black level in a television transmitting apparatus, comprising a plurality of electronic rectifiers each having a cathode and an anode, means interconnecting all the cathodes of said rectifiers and connecting them to a common source of steady D. C. potential, a first resistor connected directly between said cathodes and the anode of the first rectifier, at least one further resistor, the number of said further resistors corresponding to the number of rectifiers less one, each further resistor being directly connected between successive pairs of anodes of the rectifiers, a plurality of condensers connected respectively between an input lead and the anodes of said rectifiers, means for feeding a video waveform to said input lead with such sign that the peaks of the waveform corresponding to black are positive with respect to the peaks corresponding to white, an amplifying valve, an output lead from the anode of the last rectifier connected to the input of said amplifying valve, a limiting rectifier having its anode connected to the output of said amplifying valve and its cathode connected to a source of D. C. bias potential, and an output lead from the cathode of said limiting rectifier.

9. Apparatus as claimed in claim 8, including means for varying the D. C. bias potential applied to the cathode of the limiting rectifier.

10. A circuit arrangement for setting the black level in a television transmitting apparatus, comprising a plurality of electronic rectifiers, each having a cathode, an anode and a control electrode, means interconnecting all the cathodes of said rectifiers and connecting them to a common source of steady D. C. potential, a first resistor connected directly between said cathodes and the anode of the first rectifier, at least one further resistor, the number of said further resistors corresponding to the number of rectifiers less one, each further resistor being directly connected between successive pairs of anodes of the rectifiers, a plurality of condensers connected respectively between an input lead and the anodes of said rectifiers, means for feeding a video waveform to said input lead with such sign that the peaks of the waveform corresponding to black are positive with respect to the peaks corresponding to white, means interconnecting the control electrodes of all said rectifiers, means for applying a train of negative blanking pulses corresponding in duration and time occurrence with the interline blanking periods of the video waveform to the control electrodes of said rectifiers, and an output lead from the anode of the last rectifier.

11. A circuit arrangement for setting the black level in a television transmitting apparatus, comprising a plurality of electronic rectifiers, each having a cathode, an anode and a control electrode, means interconnecting all the cathodes of said rectifiers and connecting them to a common source of steady D. C. potential, a first resistor connected directly between said cathodes and the anode of the first rectifier, at least one further resistor, the number of said further resistors corresponding to the number of rectifiers less one, each further resistor being directly connected between successive pairs of anodes of the rectifiers, a plurality of condensers connected respectively between an input lead and the anodes of said rectifiers, means for feeding a video waveform to said input lead with such sign that the peaks of the waveform corresponding to black are positive with respect to the peaks corresponding to white, means interconnecting the control electrodes of all said rectifiers, means for applying a train of negative blanking pulses corresponding in duration and time occurrence with the interline blanking periods of the video waveform to the control electrodes of said rectifiers, an amplifying valve, an output lead from the anode of the last rectifier connected to the input of said amplifying valve, a limiting rectifier having its anode connected to the output of said amplifying valpe and its cathode connected to a source of D. C. bias potential, and an output lead from the cathode of said limiting rectifier.

12. Apparatus as claimed in claim 11, wherein means are provided for feeding negative blanking pulses, corresponding to the negative blanking pulses fed to the control electrodes of the electronic rectifiers, to the anode of the limiting rectifier.

13. Apparatus as claimed in claim 12, including means for varying the D. C. bias potential applied to the cathode of the limiting rectifier.

14. A circuit arrangement for setting the black level in a television transmitting apparatus, comprising a plurality of electronic rectifiers, each having a cathode, an anode and a control electrode, means interconnecting all the cathodes of said rectifiers and connecting them to a common source of biassing potential, a first resistor connecting said cathodes to the anode of the first rectifier, at least one further resistor, the number of said further resistors corresponding to the number of rectifiers less one, each further resistor being directly connnected between successive pairs of anodes of the rectifiers, a plurality of condensers connnected respectively between an input lead and the anodes of said rectifiers, means for feeding a video waveform to the input lead with such sign that the peaks of the waveform corresponding to black are positive with respect to the peaks corresponding to white, an electronic valve having a cathode, an anode and at least one control electrode, means for applying a train of positive blanking pulses corresponding in duration and time occurrence with the interline blanking periods of the video waveform to the control electrode of said electronic valve, means for deriving an output waveform from said electronic valve corresponding to said train of input blanking pulses but of negative sign, means for feeding said output blanking waveform to all the control electrodes of said electronic rectifiers, an output lead from the anode of the last rectifier connected to the input of an amplifying valve, a limiting rectifier having its anode connected to the output of said amplifying valve and its cathode connected to a source of biassing potential, means for feeding negative blanking pulses derived from said electronic valve to the anode of said limiting rectifier, means for varying the bias potential applied to the cathode of said limiting rectifier, and an output lead from the cathode of said limiting rectifier.

15. A circuit arrangement for setting the black level in a television transmitting apparatus, comprising at least three electronic rectifiers, each having a cathode, an anode and a control electrode, means interconnecting all the cathodes of said rectifiers and connnecting them to a common source of biassing potential, a first resistor connecting said cathodes to the anode of the first rectifier, a plurality of further resistors directly connected respectively between successive pairs of anodes of the rectifiers, a plurality of condensers connected respectively between an input lead and the anodes of said rectifiers, means for feeding a video waveform to said input lead with such sign that the peaks of the waveform corresponding to black are positive with respect to the peaks corresponding to white, means for applying a train of negative blanking pulses corresponding in duration and time occurrence with the interline blanking periods of the video waveform to all the control electrodes of the electronic rectifiers, an output lead from the anode of the last rectifier, means connecting said output lead to a limiting rectifier, and means for biassing said limiting rectifier to cut-off at approximately the black level of the video waveform applied thereto from said output lead.

16. Apparatus as claimed in claim 15, wherein the input video waveform is fed to an electronic valve connected as a cathode follower circuit, the cathode of said valve being connected to the condensers in the leads to the anodes of the electronic rectifiers.

LADISLAV LAX.

REFERENCES CITED

The following references are of record in the file of this patent:

UNITED STATES PATENTS

| Number | Name | Date |
|---|---|---|
| 2,240,490 | Cawein | May 6, 1941 |
| 2,286,730 | Hall | June 16, 1942 |
| 2,303,968 | White | Dec. 1, 1942 |
| 2,307,375 | Blumlein | Jan. 5, 1943 |
| 2,424,349 | Cawein | July 22, 1947 |

FOREIGN PATENTS

| Number | Country | Date |
|---|---|---|
| 48,431 | France (Addition to No. 812,987) | Nov. 10, 1937 |